(12) United States Patent
Duch et al.

(10) Patent No.: US 9,662,937 B2
(45) Date of Patent: May 30, 2017

(54) VEHICLE HUB BEARING UNIT PROVIDED WITH A PROTECTIVE RING

(71) Applicants: Daniele Duch, San Gillio (IT); Gianmario Fadda, Borgaro Torinese (IT)

(72) Inventors: Daniele Duch, San Gillio (IT); Gianmario Fadda, Borgaro Torinese (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/805,928

(22) Filed: Jul. 22, 2015

(65) Prior Publication Data

US 2016/0023512 A1 Jan. 28, 2016

(30) Foreign Application Priority Data

Jul. 22, 2014 (IT) .............................. TO2014A0580

(51) Int. Cl.
*F16C 43/00* (2006.01)
*B60B 27/00* (2006.01)
(Continued)

(52) U.S. Cl.
CPC ...... *B60B 27/0073* (2013.01); *B60B 27/0005* (2013.01); *F16C 33/782* (2013.01);
(Continued)

(58) Field of Classification Search
CPC ..... F16C 19/185–19/187; F16C 19/385; F16C 33/7813; F16C 33/782; F16C 33/7876;
(Continued)

(56) References Cited

U.S. PATENT DOCUMENTS 6,634,648 B1 * 10/2003 Rockwell ............ F16C 33/7886
277/560
8,523,447 B2 9/2013 Langer et al.
(Continued)

FOREIGN PATENT DOCUMENTS

DE 102008051065 A1 4/2010
JP 2005147298 A1 6/2005
(Continued)

*Primary Examiner* — James Pilkington
(74) *Attorney, Agent, or Firm* — Bryan Peckjian; SKF USA Inc. Patent Dept.

(57) ABSTRACT

A vehicle hub bearing unit including an outer ring; a wheel hub rotating about a common axis of symmetry of the outer ring and of the wheel hub; a wheel flange that extends radially from the wheel hub on the outside of the outer ring; a plurality of rolling bodies interposed between the outer ring and the wheel hub; at least one sealing assembly arranged on the side of the wheel flange, which is delimited towards the outer ring by a radially extending first face; and a protective ring that surrounds the outer ring and which radially extends in a position facing the first face of the wheel flange and beyond a first annular step of the first face that protrudes axially; a radially outer section of the protective ring overhangingly axially extending from the outer ring towards the wheel flange and axially beyond the first annular step.

7 Claims, 1 Drawing Sheet

(51) Int. Cl.
*F16C 33/78* (2006.01)
*F16C 33/80* (2006.01)
*F16C 19/18* (2006.01)

(52) U.S. Cl.
CPC ........ *F16C 33/7876* (2013.01); *F16C 33/805* (2013.01); *B60B 27/00* (2013.01); *B60B 27/0026* (2013.01); *B60B 27/0094* (2013.01); *F16C 19/186* (2013.01); *F16C 33/7896* (2013.01); *F16C 2326/02* (2013.01)

(58) Field of Classification Search
CPC .. F16C 33/7886; F16C 33/7896; F16C 33/80; F16C 33/805; F16C 2326/02; F16C 2326/10; B60B 27/0005; B60B 27/0006; B60B 27/0073; B60B 27/0094; F16J 15/164; F16J 15/3204; F16J 15/3264; F16J 15/447; F16J 15/4472; F16J 15/4474; F16J 15/4476; F16J 15/4478; F01D 11/00; F01D 11/02

USPC .................................................. 384/480, 484
See application file for complete search history.

(56) References Cited

U.S. PATENT DOCUMENTS

| 2007/0076994 | A1* | 4/2007 | Norimatsu | F16C 33/7896 384/486 |
| 2012/0007316 | A1* | 1/2012 | Terasawa | F16C 33/7876 277/361 |
| 2012/0177315 | A1 | 7/2012 | Matsuki et al. | |

FOREIGN PATENT DOCUMENTS

| JP | 2006010055 A1 | 1/2006 |
| JP | 2013052770 A | 3/2013 |

\* cited by examiner

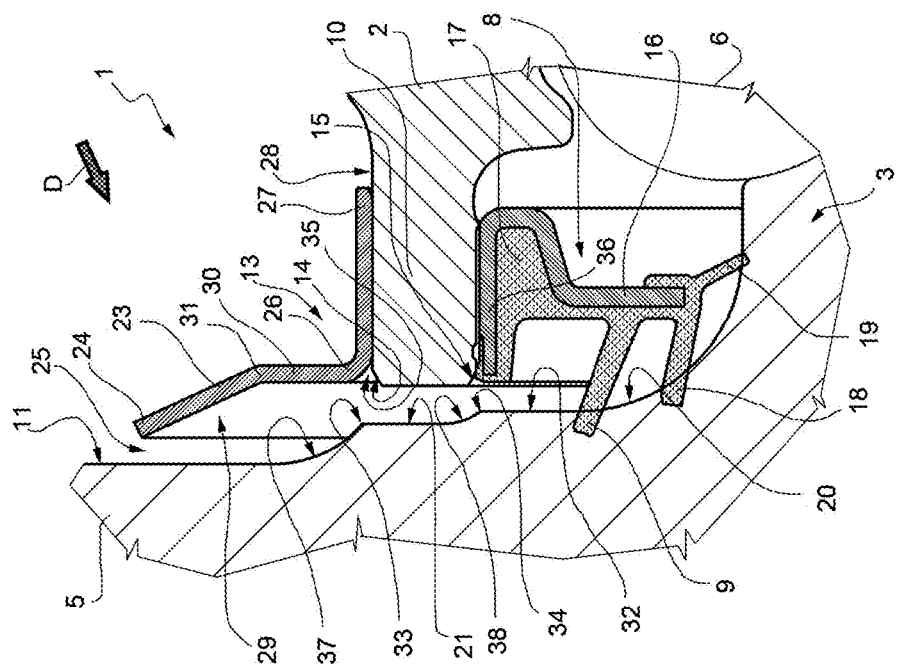
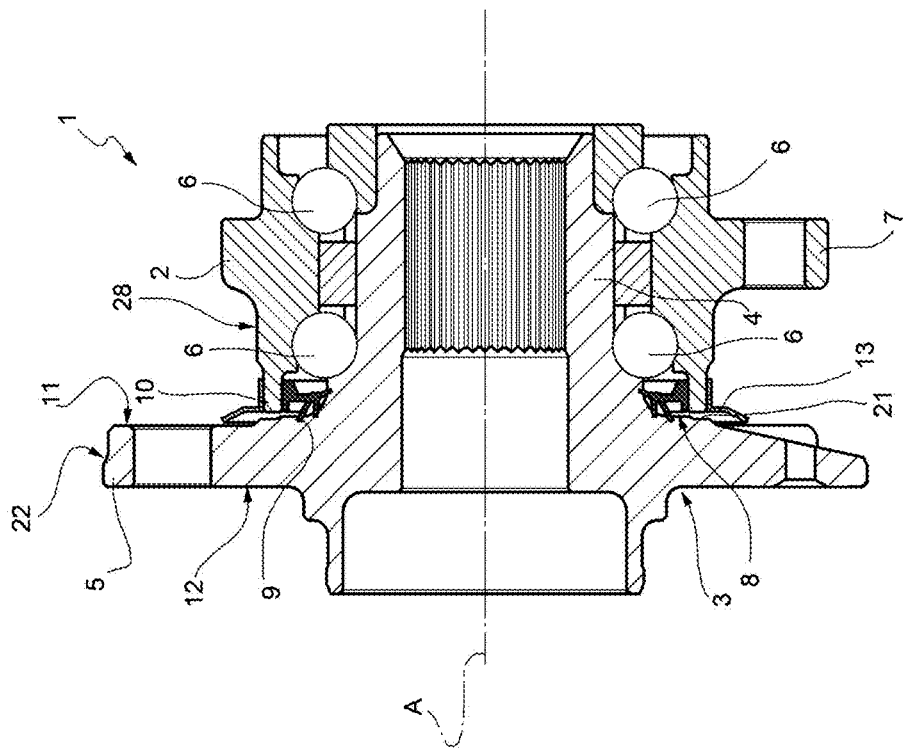

VEHICLE HUB BEARING UNIT PROVIDED WITH A PROTECTIVE RING

CROSS REFERENCE TO RELATED APPLICATIONS

This is a Non-Provisional Patent Application, filed under the Paris Convention, claiming the benefit of Italy Patent (IT) Application Number TO2014A000580, filed on 22 Jul. 2014 (Jul. 22, 2014), which is incorporated herein by reference in its entirety.

TECHNICAL FIELD OF INVENTION

The present invention relates to a vehicle hub bearing unit, of the type equipped with a sealing assembly and comprising a protective ring placed on the side of a flanged end of the unit.

KNOWN PRIOR ART

A hub bearing unit for a vehicle is known from U.S. Pat. No. 8,523,447 B1 and comprises the following: an outer ring; a wheel hub inside the outer ring; rolling elements interposed between the wheel hub and the outer ring to operatively connect the wheel hub with the outer ring; a wheel flange that extends radially from an end of the wheel hub opposite to the outer ring and, in use, faces the 'outboard' side of the vehicle; a sealing assembly interposed between the outer ring and the wheel hub on the side of the wheel flange; and a protective ring that surrounds the outer ring and which extends radially from the outer ring; the wheel flange together with the protective ring forms a labyrinth seal.

A similar arrangement is also known from JP2005147298A and from JP2006010055A.

The purpose of the protective ring is to protect the sealing lips of the sealing assembly, in particular the radially outermost lip, from direct contact with contaminants (water, mud and dust) present in the environment outside the wheel hub, so as to preserve its operation over time.

The known solutions differ from one another in the shape of the protective ring and its contactless point of cooperation with the wheel flange. For example, according to U.S. Pat. No. 8,523,447 B1, the protective ring cooperates with a radially outer rim of the wheel flange, which it overlaps to form an axially oriented labyrinth seal. This solution clearly has considerable bulk, particularly in the radial direction, is expensive due to the large size of the protective ring and is comparatively not very reliable, as the protective ring overhangingly protrudes for a considerable length and can therefore be subjected to accidental deformation during assembly or in use.

The other known solutions have similar drawbacks, for example the protective ring extends mainly in the axial direction and therefore has excessive axial bulk.

In addition, it has been found that despite the presence of a labyrinth seal applied by the protective ring on the wheel flange, a laminar flow of contaminants is formed in use due to the rotational effect of the wheel hub, which laminar flow flows along the labyrinth seal and inevitably reaches the radially outermost lip of the sealing assembly, which as a rule cooperates directly with a rear surface of the wheel flange or with a sealing surface obtained by via machining of the wheel flange, causing premature wear of this lip. US2012/0177315 and DE102008051065 do not solve these problems.

SUMMARY OF INVENTION

The object of the present invention is to provide a hub bearing unit of the described type, and therefore equipped with a protective ring, which is nevertheless devoid of the described drawbacks and which, in particular, is simple and inexpensive to manufacture, reliable and ensures improved performance in protecting the unit's sealing assembly.

Based on the invention, a hub bearing unit is therefore provided including:
- an outer ring, wherein the outer ring is stationary in use;
- a wheel hub, rotating in use about a common symmetry axis of the outer ring and of the wheel hub, the wheel hub being arranged within the outer ring and comprising a wheel flange that extends radially from the wheel hub and radially on the outside of the outer ring;
- a plurality of rolling bodies interposed between the outer ring and the wheel hub;
- at least one sealing assembly comprising at least one annular lip, the sealing assembly being interposed between the wheel hub and the outer ring on the side of the wheel flange;
- the wheel flange being delimited between a first and a second mutually opposing radial extending faces, the first face facing the outer ring and the second face facing the opposite side of the outer ring; and a protective ring which surrounds the outer ring and which radially extends from the outer ring in a position facing the first face of the wheel flange; wherein:
  - i) the first face of the wheel flange is provided with a first annular step that axially protrudes towards the outer ring and which is arranged in a radial position between a radially outermost lip of the sealing assembly and a radially outer peripheral edge of the wheel flange;
  - ii) the protective ring overhangingly radially extends from the outer ring beyond the first annular step and comprises a radially outer section which overhangingly axially extends from the outer ring and towards the wheel flange;
  - iii) the radially outer section of the protective ring has a radially outer peripheral end rim which axially extends towards of the first face of the wheel flange so as to form therewith a labyrinth seal oriented in radial direction, parallel to the first face;
  - iv) the radially outer section of the protective ring extends in axial direction and also in radial direction, so that the radially outer peripheral end rim thereof:
  - v) is arranged beyond the first annular step in axial direction, so that the protective ring axially overlaps on the first annular step;
  - vi) is arranged in a radial position which is far from the first step and such that it exerts no labyrinth seal action therewith;
  - vii) the first annular step being obtained on the first face of the wheel flange in a radial position arranged substantially flush with a first end facing the wheel flange of a fixing portion of the protective ring driven on a radially outer lateral surface of the outer ring;
  - viii) the protective ring comprising a flange portion facing the wheel flange and extending radially from the first end;
  - ix) the flange portion comprising the radially outer section of the protective ring, wherein the radially outer section is arranged obliquely to the first face of the wheel flange, and a radially inner section of the protective ring, connecting the fixing portion and the radially outer section of the protective ring, wherein the radially inner section is arranged parallel to the first face of the wheel flange; and x) an obtuse angled bend being present between the radially outer section and the radially inner section of the protective ring, which bend is arranged radially on the outside of the first step.

According to the invention, an axially inner face of the wheel flange facing the outer ring is provided on the sealing assembly side, with an axial annular step that overlaps the protective ring in the axial direction, which has its radially outer rim arranged radially on the outside of the axial step. In this way, a labyrinth seal is created between the protective ring and the wheel flange that, unlike in the known art, is radially and not axially directed, which results in compactness, both axially and radially, and which also takes the possible entry point of contaminants radially to the outside, away from the sealing lips. But, more than anything else, the laminar flow of contaminants is interrupted due to the turbulence induced by the presence of the step.

In a second aspect, the radially outer peripheral rim of the radially outer section of the protective ring is spaced apart in radial direction from the first annular step by an amount that is larger than a distance measured in axial direction between the first face of the wheel flange and the outer ring.

In another aspect, the radially outer peripheral rim of the radially outer section of the protective ring is spaced apart in radial direction from the first annular step by an amount that is larger than a multiple of the distance measured in axial direction between the first face of the wheel flange and the outer ring.

In yet another aspect, the radially outer section of the protective ring is obliquely directed to the rotation axis, wherein the protective ring is truncated-conical in shape and diverges from the rotation axis on the side of the radially outer peripheral rim thereof and towards the wheel flange.

In yet another aspect, the first face of the wheel flange has a second annular step that axially protrudes towards the outer ring with respect to the first step and is arranged radially innermost the first step, in a radial position located between a radially outermost lip of the sealing assembly and the first step.

In yet another aspect, towards the wheel flange, the outer ring has a first end delimited by a radially outer frontal rim and a radially inner frontal rim, which are chamfered and are arranged in radial positions substantially corresponding to respective radial positions of corresponding edges of the first and second annular steps.

In yet another aspect, the first face of the wheel flange has a curve sealing surface for respective sliding lips of the sealing assembly obtained immediately adjacent to the second step and radially at the innermost side of the second step; the sealing assembly being fixed to the outer ring at the radially inner rim thereof.

In yet another aspect, the first annular step is adapted to interrupt a laminar flow of contaminants flowing along the first face.

BRIEF DESCRIPTION OF DRAWINGS

The invention will now be described with reference to the accompanying drawings, which illustrate a non-limitative embodiment thereof, in which:

FIG. 1 schematically shows a view in elevation and cross-section along a radial plane of a hub bearing unit produced according to the invention; and FIG. 2 shows a detail of the hub bearing unit in FIG. 1 on an enlarged scale.

DETAILED DESCRIPTION

With reference to FIGS. 1 and 2, a vehicle hub bearing unit, in itself known as a whole, is indicated as a whole by reference numeral 1.

The hub bearing unit 1 comprises a bearing outer ring 2, stationary in use, a wheel hub 3 comprising a bearing inner ring 4 and a wheel flange 5, and a plurality of rolling bodies 6 interposed between the outer ring 2 and the wheel hub 3 to operatively connect the wheel hub 3 with the outer ring 2.

In use, the wheel hub 3 rotates about a common axis of symmetry A of the outer ring 2 and the wheel hub 3 and is arranged inside the outer ring 2.

The wheel flange 5 overhangingly radially extends from the wheel hub 3 and radially extends on the outside of the outer ring 2 that, in the non-limitative example shown, is also equipped with a flange 7 and, in use, is constrained to a suspension of the vehicle.

The hub bearing unit 1 further comprises at least one sealing assembly 8 comprising at least one annular lip 9. The sealing assembly 8 is interposed between the wheel hub 3 and the outer ring 2 on the side of the wheel flange 5 to protect the rolling bodies 6 from possible external contaminants, such as water, dust, mud, etc. The sealing assembly 8 is fitted on the outer ring 2 at an end 10 of the outer ring 2 facing the wheel flange 5.

The wheel flange 5 is delimited between a first face 11 and a second face 12, extending radially and opposite to each other; the first face 11 faces the outer ring 2 and end 10, while the second face 12 faces the side opposite to the outer ring 2 and, in use, is designed to receive a wheel of a vehicle, in a known manner and therefore not shown for simplicity.

The hub bearing unit 1 further comprises a protective ring 13 that surrounds the outer ring 2 and which extends radially from the outer ring 2 in a position facing the first face 11 of the wheel flange 5.

The purpose of the protective ring 13 is to protect the sealing assembly 8, in itself known, from a direct flow of external contaminants generally coming from a direction D, indicated by the arrow in FIG. 2.

The first end 10 of the outer ring 2 is delimited between its radially outer frontal rim 14 and its radially inner frontal rim 15, both facing towards the wheel flange 5. The sealing assembly 8 is fitted onto the outer ring 2, inside end 10 and at the radially inner rim 15 and, as non-limitatively shown in FIGS. 1 and 2, comprises a metal shield 16 that supports an elastomeric sealing ring 17 comprising lip 9, which is the radially outermost sealing lip of the sealing assembly 8 and therefore the first to be reached by external contaminants, and further annular sealing lips 18 and 19.

The sealing lips 9, 18 and 19 slidingly cooperate with a curved sealing surface 20, generally obtained by machining the wheel flange 5 on the side of face 11 between the wheel flange 5 and the bearing inner ring 4.

According to a first aspect of the invention, the first face 11 of the wheel flange 5 is not arranged flush with the sealing surface 20, as in the known art, but is instead provided with a first annular step 21 (FIG. 2) that axially protrudes towards the outer ring 2 and which is arranged in a radial position located between the radially outermost lip 9 of the sealing assembly 8 and a radially outer peripheral edge 22 of the wheel flange 5.

The protective ring 13 overhangingly radially extends from the outer ring 2 beyond the first annular step 21 and comprises a radially outer section 23, which overhangingly axially extends from the outer ring 2 towards the wheel flange 5.

The radially outer section 23 of the protective ring 13 has a radially outer peripheral rim 24 that, according to a further aspect of the invention, axially extends towards the first face 11 of the wheel flange 5 so as to form therewith a labyrinth seal 25, defined by the annular gap between face 11 and rim 24.

According to the invention, the labyrinth seal 25 is oriented in a radial direction, parallel to face 11, as the annular gap between face 11 and rim 24 defining the labyrinth seal 25 is, in fact, radially oriented.

Furthermore, in addition to the axial direction, the radially outer section 23 of the protective ring 13 also extends in the radial direction, so that its radially outer peripheral rim 24 is positioned beyond the annular step 21 in the axial direction, such that the protective ring 13 axially overlaps on the first annular step 21; but above all so that, according to the invention, rim 24 is arranged in a radial position which is far from the first step 21, in particular sufficiently far away from step 21 that rim 24 together with the step 21 cannot exert any labyrinth seal action.

In fact, contrary to the known art, where a step that could superficially be considered equivalent to step 21 is provided for the purpose of creating, together with the protective ring, an L-shaped labyrinth seal, according to the invention, step 21 is instead provided for an entirely different purpose, as shall be seen.

In particular, the radially outer peripheral rim 24 of the radially outer section 23 of the protective ring 13 is spaced apart in the radial direction from the annular step 21 by an amount which is larger than a distance measured in the axial direction between face 11 of the wheel flange 5 and the outer ring 2.

Even more specifically, the radially outer peripheral rim 24 of the radially outer section 23 of the protective ring 13 is spaced apart in the radial direction from the first annular step 21 by an amount which is a multiple of the distance measured in the axial direction between the first face 11 of the wheel flange 5 and the outer ring 2.

Essentially, the radially outer section 23 of the protective ring 13 is obliquely oriented to the rotation axis A, is truncated-conical in shape and diverges from the rotation axis A on the side of its radially outer peripheral rim 24 towards the wheel flange 5.

Furthermore, the first annular step 21 is obtained on the first face 11 of the wheel flange 5 in a radial position arranged substantially flush with an end 26, facing the wheel flange 5, of a fixing portion 27 of the protective ring 13 driven on a radially outer lateral surface 28 of the outer ring 2 and from which end 26 a flange portion 29 of the protective ring 13 radially extends, facing the wheel flange 5.

In particular, the protective ring 13 is made integrally in a single piece of sheet steel and the flange portion 29 is obtained by bending this sheet in an L at end 26; the flange portion 29 therefore comprises the radially outer section 23 of the protective ring 13 and a radially inner section 30 of the protective ring 13, connecting the fixing portion 27 and the radially outer section 23 of the protective ring 13.

The radially outer section 23 is arranged obliquely to face 11 of the wheel flange 5, while the radially inner section 30 is arranged parallel to face 11 of the wheel flange 5. An obtuse angled bend 31 placed radially on the outside of step 21 is present between parts 23 and 30.

According to a further characteristic of the invention, the first face 11 of the wheel flange 5 also has a second annular step 32 that axially protrudes towards the outer ring 2 with respect to the first step 21 and which is arranged radially inwards from the first step 21, in a radial position located between the radially outermost lip 9 of the sealing assembly 8 and the first step 21.

In combination with the presence of one or both steps 21 and 32, the outer ring 2 has one or both of its frontal rims 14 and 15 chamfered and arranged in radial positions substantially corresponding to those of the corresponding edges 33 and 34 of the annular steps 21 and 32.

In the non-limitative embodiment shown, the chamfered radially outer frontal rim 14 is radially arranged on edge 33, which is also substantially radially arranged at end 26 of the fixing portion 27 of the protective ring 13, end 26 forming a curved connection with the flange portion 29 and which, together with the chamfered rim 14, consequently defines a cavity 35 facing edge 33.

The chamfered radially inner frontal rim 15 is instead radially arranged at edge 34, which is also substantially radially arranged at a fixing portion 36 of the shield 16 of the sealing assembly 8 to the outer ring 2.

In the case where step 32 is absent, rim 15 may also be configured differently.

The curved sealing surface 20 for the respective sliding lips 9, 18 and 19 of the sealing assembly 8 is made immediately next to the second step 32 and radially internal to the second step 32.

Finally, on the side facing the radially outer edge 22 of the wheel flange 5, steps 21 and 32 are delimited by respective curved surfaces 37 and 38; curved surface 37 connects edge 33, preferably sharp, with face 11, while curved surface 38 connects step 21 with edge 34, this also preferably sharp.

Thanks to the specifically chosen geometry described, the first annular step 21 together with the protective ring 13 does not exert any labyrinth seal effect, as the axial gap between step 21, and edge 33 in particular, and protective ring 13 is larger than the annular gap defining the labyrinth seal 25.

Instead, the first annular step 21 is designed to interrupt a laminar flow of contaminants flowing, in use, along face 11, as it 'breaks' the laminar flow due to localized turbulence, which is even increased by the presence of adjacent cavity 35. Similarly, the second annular step 32 is also capable of breaking the laminar flow again, in the event that it should reform and, in any case, is designed to introduce further turbulence in the flow of contaminants, which effectively blocks the flow before it reaches lip 9.

Contrary to the known art, the contaminants that get past the labyrinth seal 25 are thus blocked and then discharged by gravity when the rotation of the wheel hub 3 progressively shifts each zone of the annular space between the wheel flange 5 and the protective ring 13 downwards, owing to the oblique shape of the radially outer lateral wall 23 and to the arranged relative position of fold 31 with reference to edge 33 of step 21.

Finally, the inclination of the radially outer section 23 of the protective ring 13 is chosen so that part 23 is arranged substantially perpendicular to the direction D of the prevailing origin of external contaminants, maximizing the shielding action of the protective ring 13.

All of the objects of the invention are therefore achieved.

The invention claimed is:
1. A vehicle hub bearing unit comprising:
an outer ring, wherein the outer ring is stationary in use;
a wheel hub, rotating in use about a common symmetry axis of the outer ring and of the wheel hub, the wheel hub being arranged within the outer ring and compris- ing a wheel flange that extends radially from the wheel hub and radially beyond an outside of the outer ring;

a plurality of rolling bodies interposed between the outer ring and the wheel hub;

a sealing assembly comprising at least one annular lip, the sealing assembly being interposed between the wheel hub and the outer ring;

the wheel flange being delimited between a first face and a second face that are mutually opposing and radial extending, the first face facing the outer ring and the second face facing a direction opposite to that of the first face, the first face of the wheel flange is provided with a first annular step that axially protrudes towards the outer ring and which is arranged in a radial position between the at least one annular lip of the sealing assembly and a radially outer peripheral edge of the wheel flange; and a protective ring which surrounds the outer ring and which radially extends from the outer ring in a position facing the first face of the wheel flange, the protective ring comprising a fixing portion and a flange portion, wherein the fixing portion is fixed to a radially outer lateral surface of the outer ring and is radially aligned with and axially opposed to the first annular step of the wheel flange, the flange portion faces the wheel flange and extends radially from a first end of the fixing portion;

the flange portion further comprises a radially inner section and a radially outer section, the radially inner section extends radially from the first end of the fixing portion in a direction parallel to the first face of the wheel flange, the radially outer section extends from a radially outer end of the radially inner section in a direction radially outwardly and axially away from the outer ring and axially towards the wheel flange such that the radially outer section is arranged obliquely to the first face of the wheel flange, the radially outer section of the protective ring has a radially outer peripheral end rim which axially extends towards the first face of the wheel flange so as to form therewith a labyrinth seal oriented in a radial direction, parallel to the first face, an obtuse angled bend being present between the radially outer section and the radially inner section of the protective ring, the obtuse angled bend is arranged radially on the outside of the first annular step; wherein:

the radially outer section of the protective ring extends in an axial direction and also in the radial direction so that the radially outer peripheral end rim thereof is arranged beyond the first annular step in the axial direction such that the protective ring axially overlaps on the first annular step, and the flange portion of the protective ring radially extends from the fixing portion beyond the first annular step such that the radially outer peripheral end rim is arranged in a radial position which is spaced from the first annular step and such that it exerts no labyrinth seal action therewith.

2. The vehicle hub bearing unit according to claim 1, wherein the radially outer peripheral end rim of the radially outer section of the protective ring is spaced apart in the radial direction from the first annular step by an amount that is larger than a distance measured in the axial direction between the first face of the wheel flange and the outer ring.

3. The vehicle hub bearing unit according to claim 1, wherein the radially outer section of the protective ring is obliquely directed to the common symmetry axis and is truncated-conical in shape.

4. The vehicle hub bearing unit according to claim 1, wherein the first face of the wheel flange has a second annular step that axially protrudes towards the outer ring with respect to the first annular step and is arranged radially inward of the first annular step, in a radial position located between the at least one annular lip of the sealing assembly and the first annular step.

5. The vehicle hub bearing unit according to claim 4, wherein, towards the wheel flange, the outer ring has a first outer ring end delimited by a radially outer frontal rim and a radially inner frontal rim, which are chamfered and are arranged in radial positions substantially corresponding to respective radial positions of corresponding edges of the first and second annular steps.

6. The vehicle hub bearing unit according to claim 5, wherein the first face of the wheel flange has a curve sealing surface for the at least one annular lip of the sealing assembly obtained immediately adjacent to the second annular step and radially at the innermost side of the second annular step; the sealing assembly being fixed to the outer ring at the radially inner frontal rim thereof.

7. The vehicle hub bearing unit according to claim 1, wherein a radially outer edge of the first annular step is connected to a radially extending outer surface of the first face by a curved surface.

\* \* \* \* \*